(12) United States Patent
Ejiri

(10) Patent No.: US 8,693,847 B2
(45) Date of Patent: Apr. 8, 2014

(54) CONTENTS PROCESSING APPARATUS AND METHOD

(75) Inventor: Jun Ejiri, Saitama (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 12/696,643

(22) Filed: Jan. 29, 2010

(65) Prior Publication Data

US 2010/0202749 A1 Aug. 12, 2010

(30) Foreign Application Priority Data

Feb. 6, 2009 (JP) ................................. 2009-025517

(51) Int. Cl.
*G11B 27/00* (2006.01)

(52) U.S. Cl.
USPC ........................................................ 386/278

(58) Field of Classification Search
None
See application file for complete search history.

(56) References Cited

U.S. PATENT DOCUMENTS

| 2006/0222337 A1* | 10/2006 | Fujikawa et al. | 386/95 |
| 2007/0071406 A1* | 3/2007 | Koga et al. | 386/95 |

FOREIGN PATENT DOCUMENTS

| JP | 9-65287 | 3/1997 |
| JP | 2000-23062 | 1/2000 |
| JP | 2001-266548 | 9/2001 |
| JP | 2002-344871 | 11/2002 |
| JP | 2003-163881 | 6/2003 |
| JP | 2005-115607 | 4/2005 |
| JP | 2005-252372 | 9/2005 |
| JP | 2006-59387 | 3/2006 |
| JP | 2006-86861 | 3/2006 |
| JP | 2007-208631 | 8/2007 |

OTHER PUBLICATIONS

Office Action issued Dec. 28, 2010, in Japanese Patent Application No. 2009-025517.
Yukinobu Yasugi, et al., "Detection of Identical Events from Sports Video by Comparing Camera Works", 2001 Convention of Institute of Electronics, Information and Communiction Engineers, 9 pages (with English Translation).

\* cited by examiner

*Primary Examiner* — William C Vaughn, Jr.
*Assistant Examiner* — Daniel Tekle
(74) *Attorney, Agent, or Firm* — Oblon, Spivak, McClelland, Maier & Neustadt, L.L.P.

(57) ABSTRACT

There is provided a contents processing apparatus including: a contents data acquisition unit that acquires data of contents; a section detection unit that detects from the acquired data of the contents a cross-fade section that includes a plurality of frames constituting a portion where a final picture of a predetermined scene is gradually changed and replaced with a picture of the next scene; a scene specifying unit that specifies a retrospective scene, where a plurality of scenes are changed in a predetermined interval, based on the detected cross-fade section; a similar scene searching unit that searches for scenes similar to the plurality of the scenes included in the specified retrospective scene from data of different contents acquired by the contents data acquisition unit; and a digest generation unit that generates a digest of the different contents by combining the searched scenes.

19 Claims, 12 Drawing Sheets

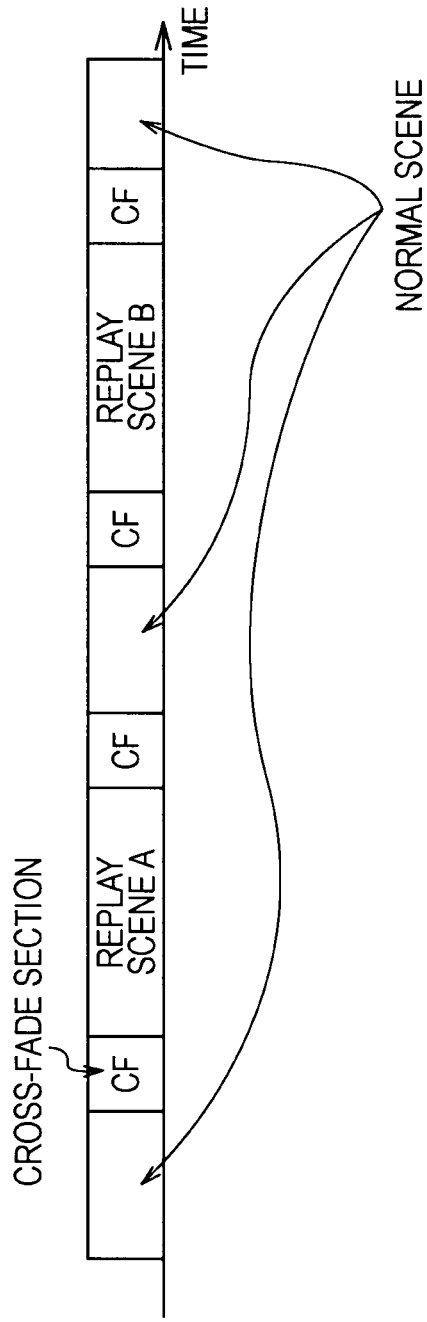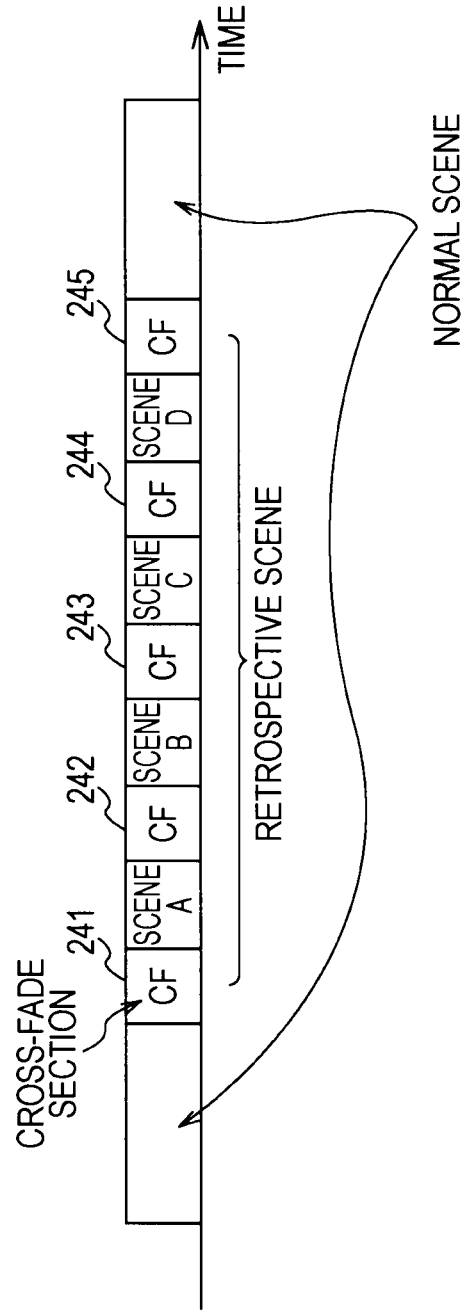

CONTENTS PROCESSING APPARATUS AND METHOD

BACKGROUND OF THE INVENTION

1. Field of the Invention

The present invention relates to a contents processing apparatus and method, and more particularly, a contents processing apparatus and method capable of simply extracting desired scenes from contents and generating a digest of especially important scenes in a short time.

2. Description of the Related Art

Recently, various contents have been broadcasted in BS broadcasts and CS broadcasts as well as terrestrial broadcasts. In addition, recently, as HDD recorders have become widespread, long-time recording and time-shift replaying have been generally used.

However, since watching time is limited, it is very difficult for users to watch all video. Therefore, a problem to be solved is how to automatically generate a digest of the video and efficiently grasp contents thereof. In these circumstances, there has been developed a digest generating technology capable of watching all the episodes of the contents in a short time by analyzing pictures, sounds, captions, and the like included in the contents, extracting only the scenes likely to be important and replaying the connected important scenes (for example, refer to Japanese Unexamined Patent Application Publication Nos. 2000-23062, 2005-252372, 2002-344871, and 2005-115607).

In addition, in order to prevent the same scene from being repetitively watched, there has been proposed a method of searching for a portion of the same picture scene (a pattern having the same picture feature) in a temporally retrospective direction with respect to a predetermined scene of the contents (for example, refer to Yashugi Yukinobu, Babaguchi Noboru, and Kitahashi Tadahiro, "Detection of Identical Events from Sports Video by Comparing Camera Works," Proceedings of The Institute of Electronics, Information and Communication Engineers, Vol. 2001, Information System 2 pp. 359-360)

However, the technologies disclosed in Japanese Unexamined Patent Application Publication Nos. 2000-23062, 2005-252372, 2002-344871, and 2005-115607 have a problem in that it is difficult to extract important scenes from pictures, sounds, captions, and the like included in the contents because the extraction depends on the details of the contents.

In addition, the method disclosed in the article written by Yashugi Yukinobu, at al., has a problem in that a great deal of time is taken to perform the process of analyzing pictures and searching for the portion of the identical picture scenes.

SUMMARY OF THE INVENTION

It is desirable to provide a contents processing apparatus and method capable of simply extracting desired scenes in contents and generating a digest of especially important scenes in a short time.

According to an embodiment of the present invention, there is provided a contents processing apparatus including: a contents data acquisition means that acquires data of contents; a section detection means that detects from the acquired data of the contents a cross-fade section that includes a plurality of frames constituting a portion where a final picture of a predetermined scene is gradually changed and replaced with a picture of the next scene; a scene specifying means that specifies a retrospective scene, where a plurality of scenes are changed in a predetermined interval, based on the detected cross-fade section; a similar scene searching means that searches for scenes similar to the plurality of the scenes included in the specified retrospective scene from data of different contents acquired by the contents data acquisition means; and a digest generation means that generates a digest of the different contents by combining the searched scenes.

The section detection means may include: a ratio calculation means that calculates an occupation ratio of monotonously-changing pixels, of which values are monotonously changed, to a to-be-processed frame in the data of the contents; an activity ratio calculation means that calculates an activity ratio between the to-be-processed frame and a frame before the to-be-processed frame; a candidate frame determination means that determines based on the calculated occupation ratio of the monotonously-changing pixels and the calculated activity ratio whether or not the to-be-processed frame is a candidate frame in the cross-fade section; and a consecutive frame counting means that detects the cross-fade section by counting the candidate frames that consecutively appear from the data of the contents.

The ratio calculation means may set the to-be-processed frame to a current frame, determine whether or not a pixel of interest of the current frame is a monotonously-changing pixel by comparing a value of the pixel of interest of the current frame with values of the pixels in a past frame and a future frame corresponding to the pixel of interest, and calculate a ratio of the pixels, which are determined to be the monotonously-changing pixels, to all the pixels constituting the current frame.

In the case where the pixel of interest and the value of the pixel corresponding to the pixel of interest are changed to be increased with the passing of time or in the case where the pixel of interest and the value of the pixel corresponding to the pixel of interest are changed to be decreased with the passing of time, if an amount of change according to the passing of time is larger than a predetermined threshold value, the pixel of interest may be determined to be the monotonously-changing pixel.

If a difference between a feature amount of a first frame and a feature amount of a second frame that temporally precedes the first frame by a predetermined number of frames is equal to or larger than a predetermined threshold value, the first frame may be set to the to-be-processed frame.

In the case where the number of consecutively appearing candidate frames is equal to or larger than a predetermined threshold value, if a value of difference between a feature amount of an initial candidate frame of the consecutive candidate frames and a feature amount of a final candidate frame thereof is equal to or larger than a predetermined value, the section detection means may detect a section from the initial candidate frame to the final candidate frame as the cross-fade section.

In the case where a predetermined number or more of the cross-fade sections are consecutively detected in a temporal distance that is smaller than a threshold value, the scene specifying means may specify a portion from the initial cross-fade section to the final cross-fade section of the consecutive cross-fade sections as the retrospective scene.

The similar scene searching means may search scenes similar to the scenes corresponding to a portion interposed between the cross-fade sections in the specified retrospective scene from the data of the different contents, and the digest generation means may generate the digest by combining data added with a predetermined number of consecutive frames before or after the searched scenes.

The searching means may search a second scene similar to a first scene that is positioned temporally at the earliest point in the scenes corresponding to the portion interposed between the cross-fade sections among the specified retrospective scene from the data of the different contents, and the searching means may search a fourth scene similar to a third scene that is temporally later than the first scene in the scenes corresponding to the portion interposed between the cross-fade sections among the specified retrospective scene from the portion that is temporally later than the second scene among the data of different contents.

According to another embodiment of the present invention, there is provided a contents processing method including the steps of: acquiring data of contents; detecting from the acquired data of the contents a cross-fade section that includes a plurality of frames constituting a portion where a final picture of a predetermined scene is gradually changed and replaced with a picture of the next scene; specifying a retrospective scene, where a plurality of scenes are changed in a predetermined interval, based on the detected cross-fade section; searching for scenes similar to the plurality of the scenes included in the specified retrospective scene from data of different contents acquired by the contents data acquisition means; and generating a digest of the different contents by combining the searched scenes.

According to still another embodiment of the present invention, data of contents are acquired; a cross-fade section that includes a plurality of frames constituting a portion where a final picture of a predetermined scene is gradually changed and replaced with a picture of the next scene is detected from the acquired data of the contents; a retrospective scene, where a plurality of scenes are changed in a predetermined interval, is searched based on the detected cross-fade section; scenes similar to the plurality of the scenes included in the specified retrospective scene are searched from data of different contents acquired by the contents data acquisition means; and a digest of the different contents is generated by combining the searched scenes.

According to the invention, it is possible to simply extract a desired scene from the contents and to generate a digest constructed with especially important scenes in a short time.

BRIEF DESCRIPTION OF THE DRAWINGS

FIG. 10 is a diagram illustrating an example of a replay scene of contents of a spots program.

FIG. 11 is a diagram illustrating an example of a retrospective scene of contents of a drama series or the like.

DESCRIPTION OF THE PREFERRED EMBODIMENTS

Hereinafter, exemplary embodiments of the invention are described with reference to the attached drawings.

Figure 1:
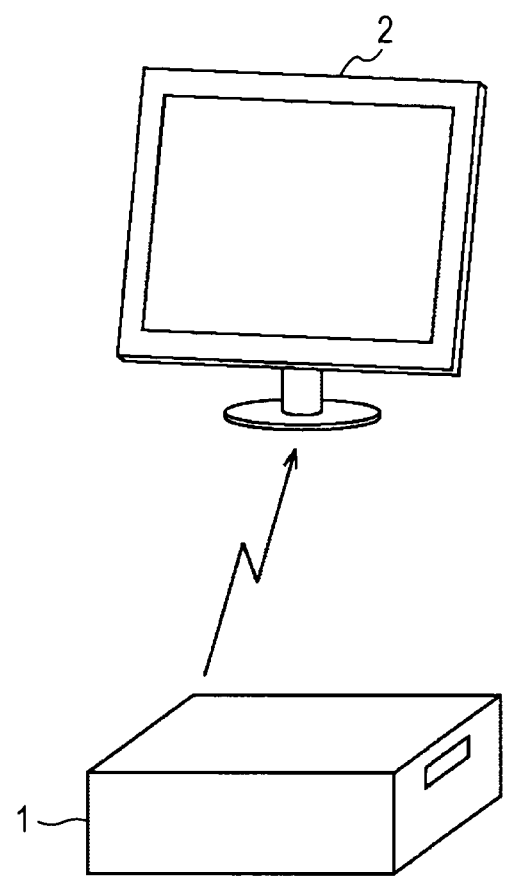
FIG. 1 is a diagram illustrating an example of a contents processing apparatus according to an embodiment of the invention.

FIG. 1 is a diagram illustrating an example of a contents processing apparatus according to an embodiment of the invention. The contents processing apparatus 1 shown in the figure is configured, for example, as a HDD (hard disc drive) recorder, which is connected to a display 2 that is configured as a television set or the like.

Figure 2:
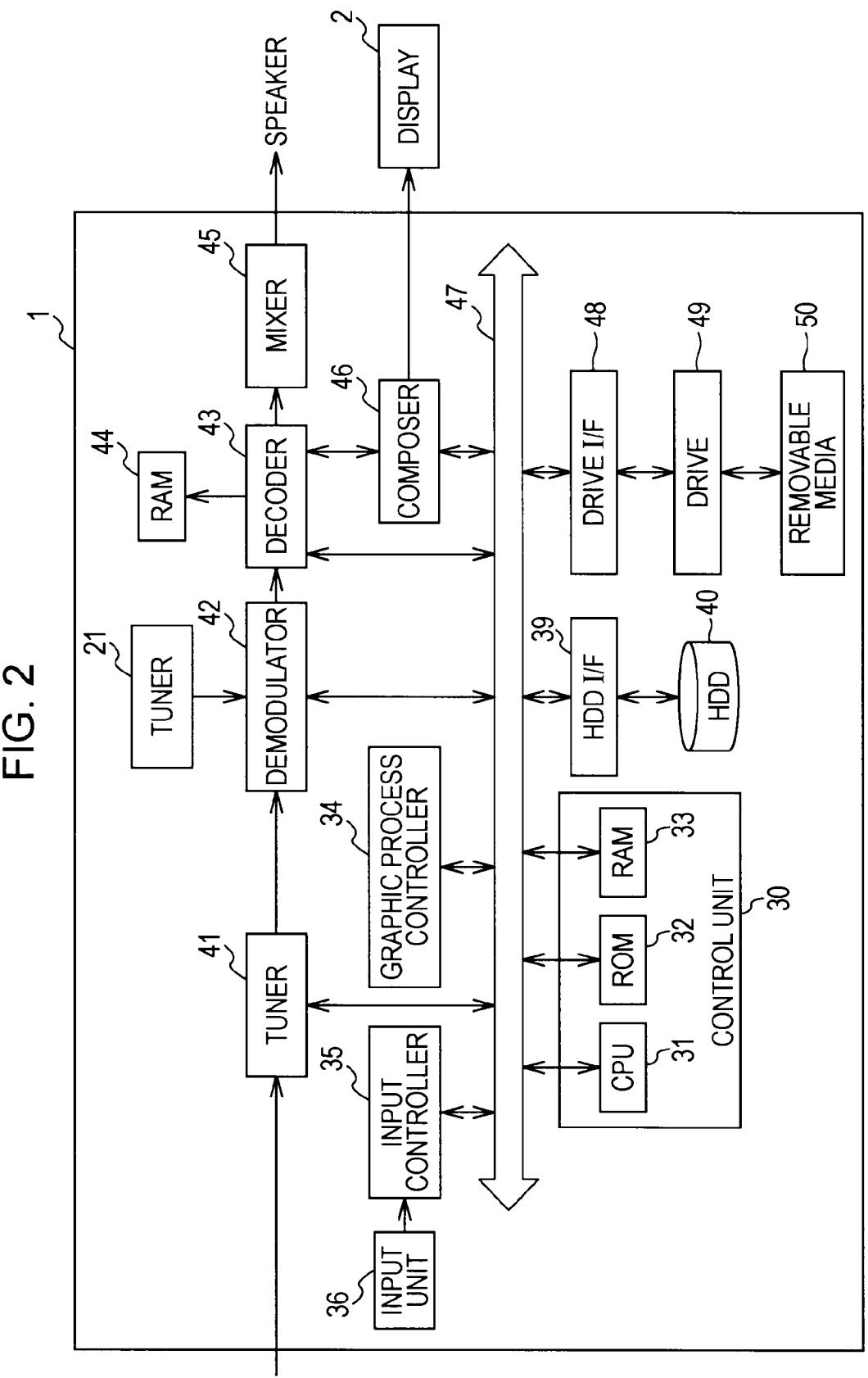
FIG. 2 is a block diagram illustrating an example of a configuration of the contents processing apparatus shown in FIG. 1.

FIG. 2 is a block diagram illustrating an example of a configuration of the contents processing apparatus 1 shown in FIG. 1.

The contents processing apparatus 1 is configured to record a TV broadcast program, for example, according to a recording schedule that is set by a user. The contents processing apparatus 1 may record a large amount of contents in a HDD 40 having a large storage capacity.

In addition, the contents processing apparatus 1 includes a control unit 30 that is constructed with a CPU (central processing unit) 31, a ROM (read only memory) 32, and RAM (random access memory) 33. The control unit 30 is a main controller that controls the entire operations of the contents processing apparatus 1. The control unit 30 allows the contents processing apparatus 1 to perform a predetermined process by executing software, for example, a program or the like.

The graphic process controller 34 is constructed with a DSP (digital signal processor), a general-purpose GPU (graphics processing unit), or the like to generate picture data. In addition, the graphic process controller 34 generates, for example, a GUI (graphical user interface) picture through which a user may input various settings.

An input controller 35 supplies through a bus 47 to a CPU 31 an input signal corresponding to user's manipulation, which is obtained through the user's manipulation of an input unit 36, for example, buttons, switches, or keyboard, or the like, that is, an input signal (manipulation information) indicating the user's instruction. In addition, the input controller 35 allows the input unit 36 as a light-receiving unit to receive an infrared signal corresponding to the user's manipulation, which is transmitted from a remote controller (not shown), and to convert the infrared signal to an electrical signal and supplies the electrical signal to the CPU 31.

An HDD I/F 39 controls access of the HDD 40 to data based on the control of the control unit 30.

The HDD 40 is a random access storage unit which may store various data including programs or contents in a predetermined file format. The HDD 40 is connected through the HDD I/F 39 to the bus 47. If various data such as contents as a program and EPG data are supplied from a decoder 43, the HDD 40 records the data. If there is a request for reading, the HDD 40 outputs the recorded data.

In addition, the control unit 30 controls the HDD I/F 39, the HDD 40, a tuner 41, a demodulator 42, the decoder 43, and the like to execute contents recording or replaying, for example, based on the input signal (manipulation information) supplied through the bus 47 from the input controller 35.

In addition, a broadcasting wave that is received through an antenna (not shown) is supplied to the tuner 41. The broadcasting wave is configured in accordance with a predetermined format and includes, for example, EPG data. The broadcasting wave may be any type of broadcasting wave, that is, a satellite broadcasting wave or a terrestrial one. In addition, the broadcasting wave is transmitted through an arbitrary communication line, that is, a wired communication line or a wireless communication line.

The tuner 41 performs tuning a broadcasting wave of a predetermined channel, that is, selects a station, and outputs the received data to the demodulator 42, for example, based on the control of the control unit 30.

The demodulator 42 demodulates the digital-modulated received data and outputs the data to the decoder 43.

For example, in the case of the digital satellite broadcast, the digital data that are received by the tuner 41 and demodulated by the demodulator 42 are transport streams in which AV data compressed in the MPEG2 (Moving Picture Experts Group 2) scheme and data for data broadcast are multiplexed. The former AV data are picture data and sound data that constitute a body of the broadcast program, and the latter data for the data broadcast include data annexed to the body of the broadcast program (for example, EPG data).

The decoder 43 separates the AV data compressed in the MPEG2 scheme and the data for data broadcast (for example, the EPG data) from the transport stream supplied from the demodulator 42. The separated data for the data broadcast are supplied through the bus 47 and the HDD I/F 39 to the HDD 40 so as to be recorded therein.

In the case where the received program (contents) is to be viewed, the decoder 43 further separates the compressed picture data and the compressed sound data from the AV data. The separated sound data are decoded into PCM (pulse code modulation) data, and after that, output through the mixer 45 to the speaker 13. In addition, the separated picture data are decoded, and after that, supplied through the composer 46 to the display 2.

In addition, in the case where the received program (contents) is instructed to be recorded in the HDD 40, the decoder 43 outputs the before-separation AV data (the AV data including the multiplexed picture data and sound data) through the bus 47 and the HDD I/F 39 to the HDD 40. In addition, in the case where the program recorded in the HDD 40 is instructed to be replayed, the decoder 43 separates the compressed picture data and the compressed sound data from the AV data that are input from the HDD 40 through the bus 47 and the HDD I/F 39. Next, the decoder 43 decodes the compressed picture data and the compressed sound data and supplies the decoded picture data and the decoded sound data to the mixer 45 and the composer 46.

If necessary, the mixer 45 combines the sound data supplied from the decoder 43 and the sound data recorded in the HDD 40 and supplies the combined sound data to the speaker of the display 2, or the like.

If necessary, the composer 46 combines the picture data supplied from the decoder 43 and the picture data supplied from the graphic process controller 34 and supplies the combined picture data to the display 2.

In addition, the contents processing apparatus 1 may be configured to be connected to a network such as the Internet so that the contents transmitted through the Internet are recorded. In addition, although the configuration where the contents are recorded in the HDD 40 is described, the contents may be recorded in a removable media 50 (for example, a DVD (digital versatile disc)) mounted on the drive 49.

The contents processing apparatus 1 is configured to analyze the data of the recorded contents and detect a section in which a specific scene such as a retrospective scene and a replay scene is included. Herein, the retrospective scene is set to, for example, scenes that are included at the head of the drama series to explain a review of the preceding episodes. In addition, the replay scene may be set to scenes where remarkably good plays are replayed, for example, in a sports program such as live broadcast of a professional baseball game.

In addition, the contents processing apparatus 1 may generate a digest by searching for scenes similar to the scenes in the detected section from the data of the recorded contents and combining the searched scenes. Herein, since the digest is configured so that only the scenes likely to be important are extracted from the scenes included in the contents and the connected important scenes are replayed, all episodes of the contents may be watched in a short time.

Figure 3:
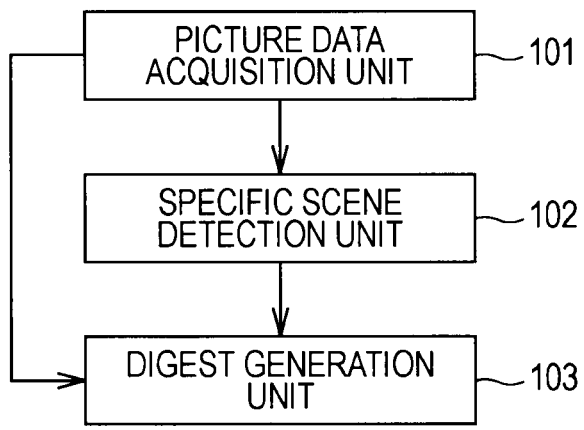
FIG. 3 is a block diagram illustrating an example of a functional configuration of software executed by a control unit shown in FIG. 2.

FIG. 3 is a block diagram illustrating an example of a functional configuration of software executed by the control unit 30 shown in FIG. 2.

The data acquisition unit 101 reads and acquires, for example, the data of the contents, from which the section including the specific scene is to be detected, or the data of the contents, from which the digest is to be generated, from the HDD 40.

As described later, the specific scene detection unit 102 analyzes the data of the contents supplied from the data acquisition unit 101 so as to detect the later-described cross-fade section from a featured section in which the retrospective scene, the replay scene, or the like are specified.

The digest generation unit 103 specifies the retrospective scene, the replay scene, and the like based on the cross-fade section detected by the specific scene detection unit 102. In addition, the digest generation unit 103, for example, searches for scenes similar to a plurality of the scenes included in the retrospective scene from the data of the contents supplied from the data acquisition unit 101. Next, the digest generation unit 103 generates the digest by combining the searched scenes.

Figure 4:
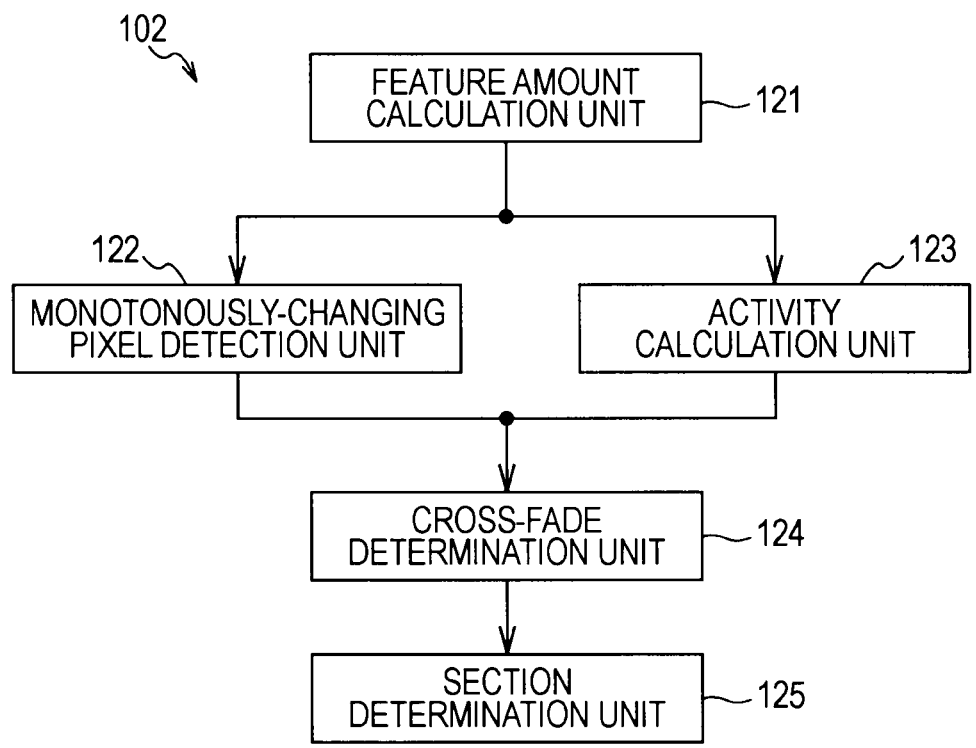
FIG. 4 is a block diagram illustrating an example of a detailed configuration of a specific scene detection unit shown in FIG. 3.

FIG. 4 is a block diagram illustrating an example of a detailed configuration of the specific scene detection unit 102 shown in FIG. 3. The specific scene detection unit 102 detects the cross-fade so as to specify the retrospective scene, the replay scene, or the like. Herein, the cross-fade includes a plurality of frames constituting, for example, a portion where a final picture of a predetermined scene is gradually changed and replaced with a picture of a next scene. In most of the normal contents, since cross-fade is inserted before and after the retrospective scene and the replay scene, the specific scene detection unit 102 may specify the retrospective scene, the replay scene, and the like by detecting the cross-fade.

The feature amount calculation unit 121 shown in FIG. 4 calculates a feature amount of a picture of a predetermined frame. For example, the feature amount calculation unit 121 calculates a histogram of luminance values of pixels as the feature amount of the pixels. The feature amount calculation unit 121 sets a to-be-processed frame as the current frame and extracts the past frame that precedes the to-be-processed frame by n frames to calculate a histogram of the luminance values of the pixels of the past frame. Next, the feature amount calculation unit 121 calculates a sum of absolute values of differences between elements of the histogram of the current frame and elements of the histogram of the past frame and determines whether or not the value of the obtained sum of absolute values is equal to or larger than a predetermined threshold value. If the sum of absolute values of the differences is equal to or larger than a predetermined threshold value, the feature amount calculation unit 121 performs the process of the monotonously-changing pixel detection unit 122 and the process of the activity calculation unit 123 on the frame.

In other words, in the case where a degree of change of the picture with respect to the past frame is small (for example, in the case where the sum of absolute values of differences between the elements of the histograms is small), the frame is not likely to be the frame of the cross-fade. Therefore, the feature amount calculation unit 121 selects only the frames having a high degree of change of the picture with respect to the past frame.

The monotonously-changing pixel detection unit 122 determines whether or not each of the pixels constituting the designated (selected) frame is the monotonously-changing pixel. The monotonously-changing pixel detection unit 122 extracts the past frames that are replayed temporally before the current frame, which is the designated frame, and the future frames that are replayed temporally after the current frame. Herein, each of the past frame and the future frame may be separated by a predetermined number of frames from the current frame. In addition, each of the past frame and the future frame may be a consecutive frame of the current frame.

The monotonously-changing pixel detection unit 122 extracts one pixel at the same coordinate position in each frame of the past frame, the current frame, and the future frame and compares the value of the pixel v1 of the past frame, the value of the pixel v2 of the past frame, and the value of the pixel v3 of the future frame.

Figure 5:
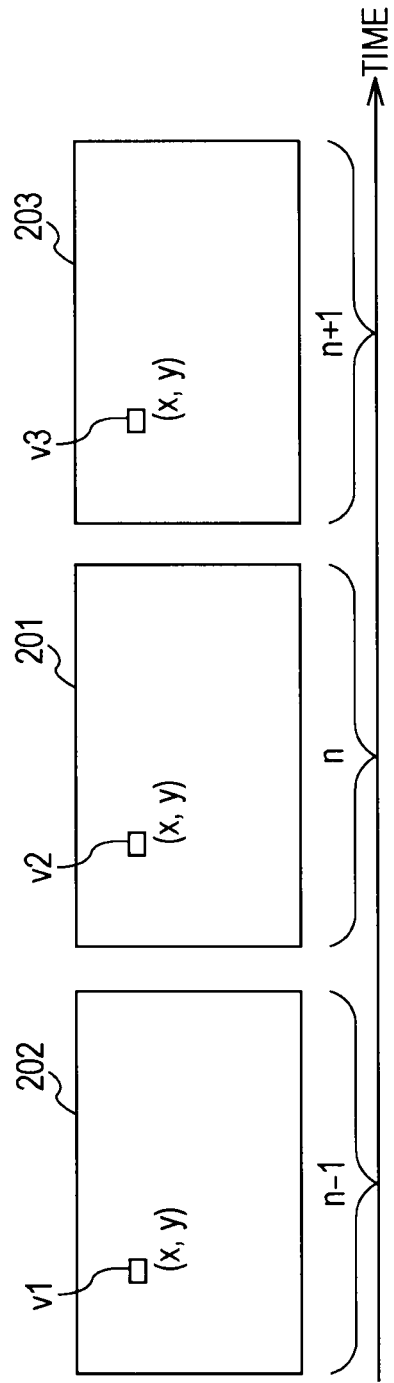
FIG. 5 is a diagram illustrating processes of a monotonously-changing pixel detection unit shown in FIG. 4.

For example, as shown in FIG. 5, the n-th frame 201 among a plurality of the frames included in the contents as a moving picture is set to the current frame, which is the to-be-processed frame. Therefore, the (n−1)-th frame 202 is set to the past frame, and the (n+1)-th frame is set to the future frame 203. For example, the pixel at the coordinate position (x,y) in the current frame 201 is set to a pixel of interest, and pixels at the same coordinate position as the pixel are extracted from the frame 202 and the frame 203. The value of the pixel of interest in the frame 201 is set to v2; the value of the pixel at the coordinate position (x,y) in the frame 202 is set to v1; and the value of the pixel at the coordinate position (x,y) in the frame 203 is set to v3.

As described above, the monotonously-changing pixel detection unit 122 determines whether or not the pixel of interest is a monotonously-changing pixel. Herein, as a function for determining whether or not the pixel of interest is the monotonously-changing pixel, a function mono having values of the pixel of interest, the pixel of the past frame corresponding to the pixel of interest, and the pixel of the future frame corresponding to the pixel of interest as variables is defined as follows.

In the case where the values v1 to v3 of the aforementioned pixels satisfy Equation (1) or (2), the function mono is expressed by Equation (3).

[Equation 1]

$$(v1<v2<v3, v2-v1<TH, \text{ and } v3-v2<TH) \quad (1)$$

[Equation 2]

$$(v3<v2<v1, v2-v3<TH, \text{ and } v1-v2<TH) \quad (2)$$

[Equation 3]

$$\text{mono}(v1,v2,v3)=1 \quad (3)$$

In the case where the values v1 to v3 of the aforementioned pixels do not satisfy Equation (1) or (2), the function mono is expressed by Equation (4).

[Equation 4]

$$\text{mono}(v1,v2,v3)=0 \quad (4)$$

In addition, the TH in Equations (1) and (2) denotes a predetermined threshold value.

In other words, in the case where the values of the pixel of interest and the pixel corresponding to the pixel of interest are changed so as to be gradually increased from the past to the future and the change in the value is larger than a threshold value, the values v1 to v3 of the pixels satisfy Equation (1). In addition, in the case where the values of the pixel of interest and the pixel corresponding to the pixel of interest are changed so as to be gradually decreased from the past to the future and the change in the value is larger than a threshold value, the values v1 to v3 of the pixels satisfy Equation (2). In these cases, the pixel of interest is determined to be the monotonously-changing pixel, and the result of calculation of the function mono becomes 1. On the other hand, the pixels of interest that do not satisfy the conditions are not determined to be the monotonously-changing pixel, and the result of calculation of the function mono becomes 0.

The monotonously-changing pixel detection unit 122 determines with respect to all pixels included in the frame 201 whether or not each pixel is a monotonously-changing pixel as described above and calculates an occupation ratio of the monotonously-changing pixels to all the pixels included in the frame 201. The ratio $diss_n$ of the monotonously-changing pixels in the n-th frame may be calculated by Equation (5).

[Equation 5]

$$diss_n = \frac{1}{W \times H} \left( \sum_{x=1}^{W} \sum_{y=1}^{H} \text{mono}(f_{n-1}(x, y), f_n(x, y), f_{n+1}(x, y)) \right) \times 100 \quad (5)$$

In addition, in Equation (5), W denotes the number of pixels in the horizontal direction of a picture in a frame, and H denotes the number of pixels in the vertical direction of the picture in the frame. In addition, in Equation (5), $f_n(x,y)$ denotes a value of a pixel at a coordinate position (x,y) in the n-th frame. Similarly, $f_{n-1}(x/y)$ denotes a value of a pixel at a coordinate position (x,y) in the (n−1)-th frame, and $f_{n+1}(x,y)$ denotes a value of a pixel at a coordinate position (x,y) in the (n+1)-th frame.

Returning to FIG. 4, the activity calculation unit 123 calculates an activity indicating a degree of variation of the values of the pixels in the frame designated (selected) by the feature amount calculation unit 121. The activity $act_n$ of the n-th frame may be calculated by Equations (6) and (7).

[Equation 6]

$$act_n = \sum_{x=1}^{W} \sum_{y=1}^{H} |f_n(x, y) - ave_n| \quad (6)$$

[Equation 7]

$$ave_n = \left( \sum_{x=1}^{W} \sum_{y=1}^{H} f_n(x, y) \right) / (W \times H) \quad (7)$$

Similarly, the activity calculation unit 123 also calculates the activity $act_{n-1}$ of the (n-1)-th frame and a ratio between the activity $act_n$ of the n-th frame and the activity $act_{n-1}$ of the (n-1)-th frame as follows.

In the case where the activity $act_n$ and the activity $act_{n-1}$ satisfy the relationship of Equation (8), the ratio $act\_r_n$ between the activity $act_n$ of the n-th frame and the activity $act_{n-1}$ of the (n-1)-th frame is expressed by Equation (9).

[Equation 8]

$$act_n > act_{n-1} \quad (8)$$

[Equation 9]

$$act\_r_n = act_{n-1}/act_n \quad (9)$$

On the other hand, in the case where the activity $act_n$ and the activity $act_{n-1}$ do not satisfy the relationship of Equation (8), the ratio $act\_r_n$ between the activity $act_n$ of the n-th frame and the activity $act_{n-1}$ of the (n-1)-th frame is expressed by Equation (10).

[Equation 10]

$$act\_r_n = act_n/act_{n-1} \quad (10)$$

In this manner, the monotonously-changing pixel detection unit 122 calculates the ratio of the monotonously-changing pixels to all the pixels in the frame designated by the feature amount calculation unit 121. In addition, the activity calculation unit 123 calculates the activity ratio between the frame designated by the feature amount calculation unit 121 and the frame before the designated frame.

The cross-fade determination unit 124 determines based on the ratio of the monotonously-changing pixels calculated by the monotonously-changing pixel detection unit 122 and the activity ratio calculated by the activity calculation unit 123 whether or not the associated frame is the frame of the cross-fade. The cross-fade determination unit 124 calculates a value of the variable FADE for determining whether or not the associated frame is the frame of the cross-fade by using Equation (11).

[Equation 11]

$$FADE = diss_n + |act\_r_n - 1| \times ACT\_C \quad (11)$$

In addition, Equation (11), the ACT_C is set to an integer.

If the value of the variable FADE is larger than a predetermined threshold value, the cross-fade determination unit 124 determines that the associated frame is a candidate frame of the cross-fade. In addition, if the value of the variable FADE is equal to or smaller than the predetermined threshold value, the cross-fade determination unit 124 determines that the associated frame is not a candidate frame of the cross-fade.

Figure 6:
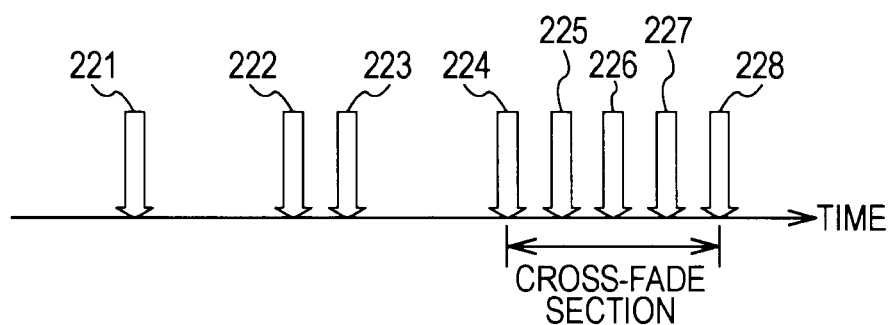
FIG. 6 is a diagram illustrating processes of a section determination unit shown in FIG. 4.

By the processes hereinbefore, the frames that are to be the candidate frame of the cross-fade are detected, for example, from all the frames of one set of contents. For example, as shown in FIG. 6, the candidate frames of the cross-fade are detected at the positions indicated by arrows from the frames of the contents. In the example of FIG. 6, the temporal positions in the moving picture of the contents are indicated by the arrows 221 to 228, and the frames that are to be the candidate frames of the cross-fade are detected at the positions indicated by the arrows 221 to 228.

Returning to FIG. 4, the section determination unit 125 detects the frame that is determined to be the candidate frame by the cross-fade determination unit 124 and counts the number of consecutive candidate frames. Next, if the number of consecutive candidate frames is equal to or larger than a predetermined threshold value, the section determination unit 125 calculates a difference in a feature amount between the pictures of the initial frame and the final frame among the consecutive frames. The section determination unit 125 calculates, for example, histograms of the luminance values of the pixels as the feature amount of the pictures and calculates a sum of absolute values of differences between elements of the histogram of the initial frame of the histogram of the final frame. Next, if the sum of absolute values between the elements of the histogram of the initial frame and the histogram of the final frame is equal to or larger than a predetermined threshold value, the section determination unit 125 determines the section constructed with the consecutive candidate frames as the cross-fade section.

For example, the aforementioned threshold value is set to 5, and the determination process of the section determination unit 125 is described with reference to FIG. 6. Although the candidate frame is detected at the position indicated by the arrow 221, since there is a consecutive candidate frame, the section determination unit 125 determines that the section is not a cross-fade section. In addition, although the candidate frames are detected at the positions indicated by the arrows 222 and 223, since there are two consecutive candidate frames, the section determination unit 125 determines that the section is also not a cross-fade section. In addition, the section determination unit 125 detects the candidate frames at the positions indicated by the arrows 224 to 228. For example, in the case where the frame at the position indicated by the arrow 224 is a p-th frame, the frame at the position indicated by the arrow 225 is the (p+1)-th frame; the frame at the position indicated by the arrow 226 is the (p+2)-th frame; . . . ; the frame at the position indicated by the arrow 228 is the (p+4)-th frame. In other words, the candidate frames at the positions indicated by the arrows 224 to 228 are five consecutive frames.

In this case, since there are five consecutive candidate frames, a difference in a feature amount between the frame at the position indicated by the arrow 224 and the frame at the position indicated by the arrow 228 (for example, a sum of absolute values of differences between histograms) is calculated. Next, if the difference in the feature amount is equal to or larger than a threshold value, a section constructed with the frame at the position indicated by the arrow 224 to the frame at the position indicated by the arrow 228 is determined to be the cross-fade section.

In this manner, the cross-fade section is specified.

Figure 7:
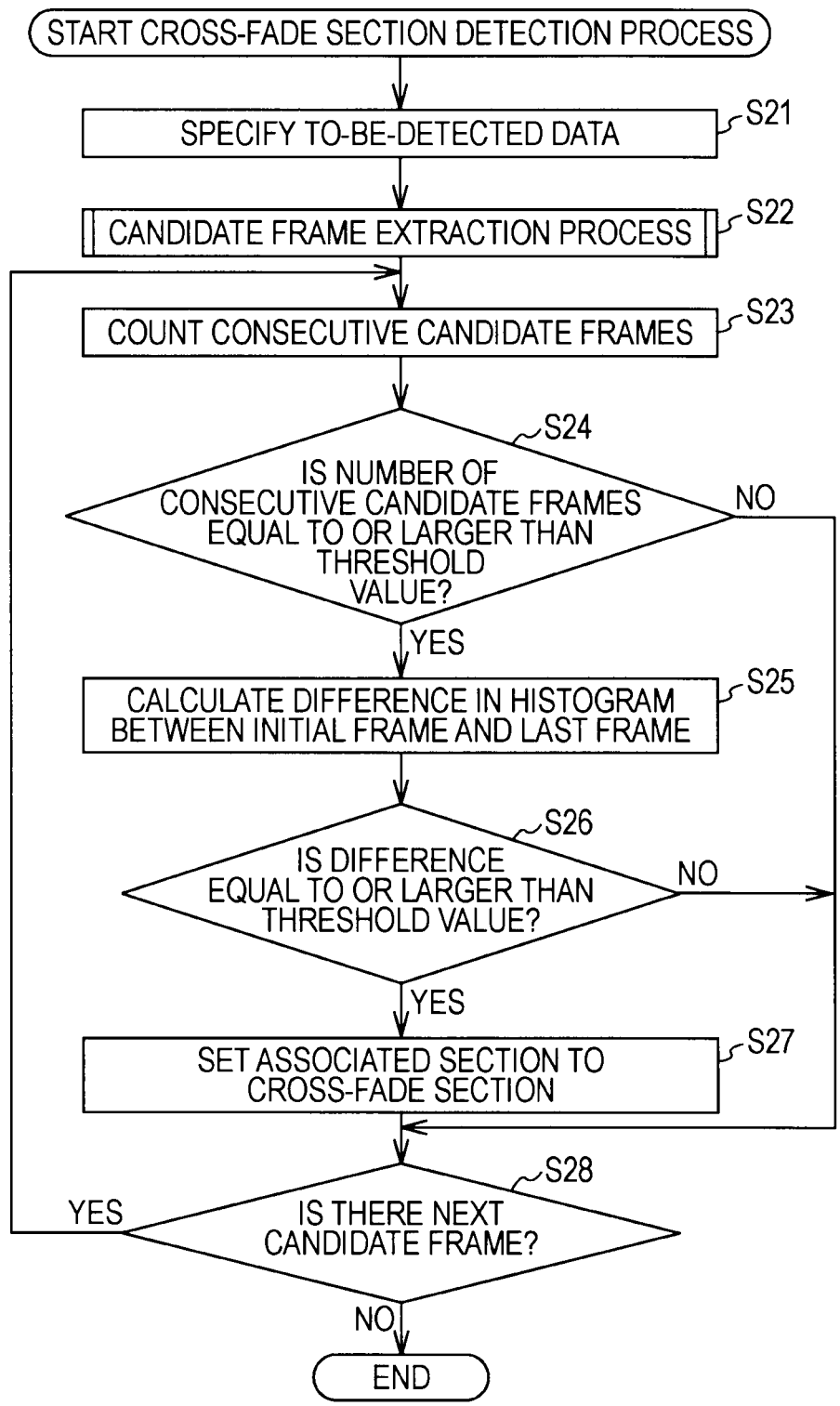
FIG. 7 is a flowchart illustrating an example of a cross-fade section detection process.

Next, an example of the cross-fade section detection process performed by the specific scene detection unit 102 is described with reference to flowcharts of FIGS. 7 to 9.

In the Step S21, the specific scene detection unit 102 specifies the to-be-processed data where cross-fade section is to be detected. For example, data of one set of contents or data in the section designated by a user among the data of one set of contents is specified as the to-be-searched data.

In the Step S22, the specific scene detection unit 102 executes the candidate frame extraction process, which is described later with reference to FIG. 8, on the to-be-processed data specified in the Step S21. Herein, a detailed example of the candidate frame extraction process of the Step S22 of FIG. 7 is described with reference to a flowchart of FIG. 8.

Figure 8:
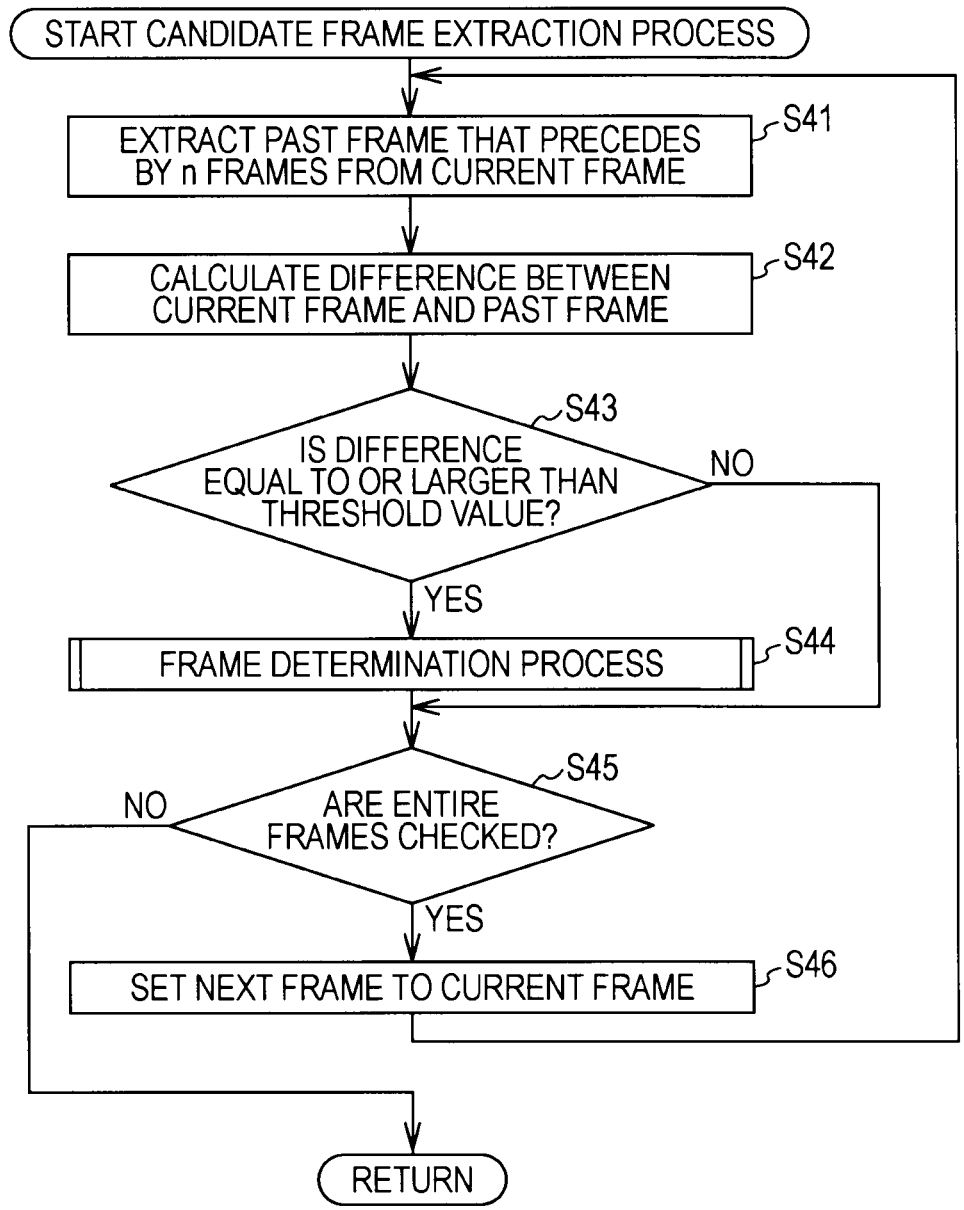
FIG. 8 is a flowchart illustrating an example of a candidate frame extraction process.
Figure 9:
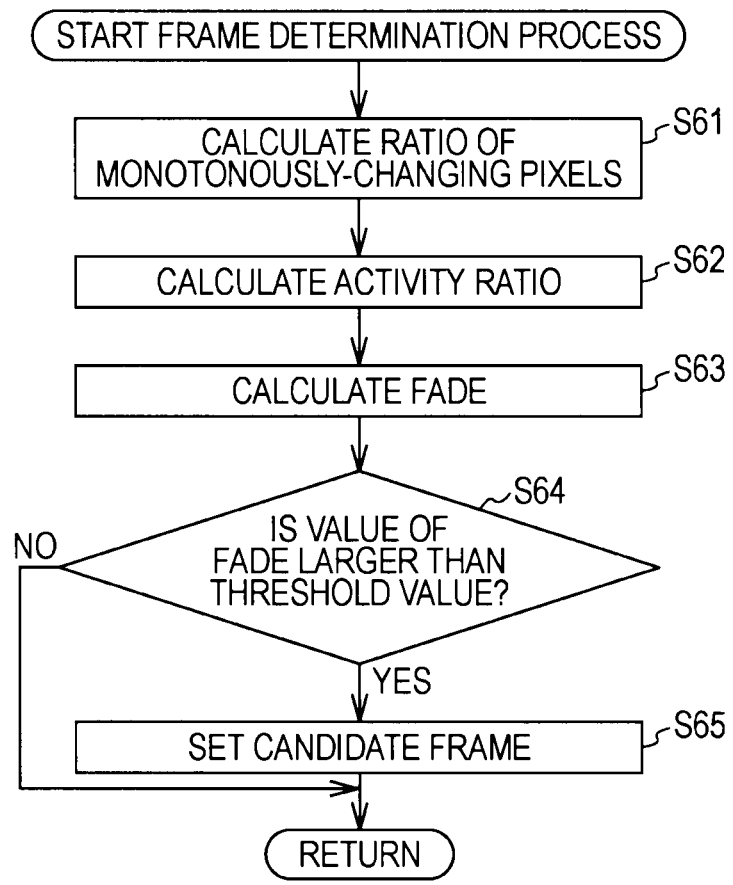
FIG. 9 is a flowchart illustrating an example of a frame determination process.

In the Step S41 shown in FIG. 8, the feature amount calculation unit 121 shown in FIG. 4 sets a to-be-processed frame to the current frame and extracts, for example, the past frame that precedes the to-be-processed frame by n frames.

In the Step S42, the feature amount calculation unit 121 calculates histograms of the luminance values of the pixels in the current frame and the past frame. Next, the feature amount calculation unit 121 calculates, for example, a sum of absolute values of differences between elements of the histogram of the current frame and the histogram of the past frame as a difference between the current frame and the past frame.

In the Step S43, the feature amount calculation unit 121 determines whether or not the difference obtained in the process of the Step S42 is equal to or larger than a predetermined threshold value. If the difference is equal to or larger than the predetermined threshold value, the procedure proceeds to the Step S44. On the other hand, if the difference is smaller than the threshold value, the process of the Step S44 is skipped.

In the Step S44, the monotonously-changing pixel detection unit 122, the activity calculation unit 123, and the cross-fade determination unit 124 execute the frame determination process which is described later with reference to FIG. 9. Herein, a detailed example of the frame determination process of the Step S44 of FIG. 8 is described with reference to a flowchart of FIG. 9.

In the Step S61, the monotonously-changing pixel detection unit 122 calculates an occupation ratio of the monotonously-changing pixels to all the pixels in the to-be-processed frame.

At this time, as described above, it is determined by using Equations (1) to (4) whether or not each pixel in the frame is a monotonously-changing pixel. Next, by using Equation (5), the ratio of the monotonously-changing pixels in the frame is calculated.

In the Step S62, the activity ratio between the to-be-processed frame and the frame before the to-be-processed frame is calculated.

At this time, as described above, the activity representing a degree of variation of the values of the pixels in the frame is calculated by Equations (6) and (7). In addition, the ratio between the activity of the to-be-processed frame and the activity of the frame before the to-be-processed frame is calculated by Equations (8) to (10).

In the Step S63, the cross-fade determination unit 124 calculates the variable FADE based on the ratio of the monotonously-changing pixels calculated by the process of the Step S61 and the activity ratio calculated by the process of the Step S62. As described above, the variable FADE that is set to the variable for determining whether or not the associated frame is the frame of the cross-fade is calculated by Equation (11).

In the Step S64, the cross-fade determination unit 124 determines whether or not the value of the variable FADE calculated in the Step S63 is larger than a predetermined threshold value.

In the Step S64, if the value of the variable FADE is determined to be larger than the predetermined threshold value, the procedure proceeds to the Step S65, in which the cross-fade determination unit 124 sets the to-be-processed frame to the candidate frame.

On the other hand, if the value of the variable FADE is equal to or smaller than the predetermined threshold value in the Step S64, the process of the Step S65 is skipped.

In this manner, the frame determination process is executed, so that it is determined whether or not the associated frame is the candidate frame for the cross-fade.

Returning to FIG. 8, after the process of Step S44, the procedure proceeds to the Step S45, in which it is determined whether or not the processes of the Step S41 to the Step S44 are executed with respect to all frames. If the processes with respect to all the frames are determined not to be executed, the procedure proceeds to the Step S46, in which the next frame is set to the current frame and the processes of the Step S41 to the Step S45 are repetitively executed.

In the Step S46, if the process is determined to be performed on all the frames, the candidate frame extraction process is ended. Therefore, it is determined whether or not all the frames included in the to-be-processed data specified in the Step S21 are the candidate frames.

Returning to FIG. 7, after the process of the Step S22, the procedure proceeds to the Step S23.

In the Step S23, the section determination unit 125 detects the frame that is determined to be the candidate frame by the process of the Step S22 and counts the number of consecutive candidate frames.

In Step S24, the section determination unit 125 determines whether or no the number of consecutive candidate frames is equal to or larger than a predetermined threshold value. If the number of consecutive candidate frames is determined to be equal to or larger than the predetermined threshold value in the Step S24, the procedure proceeds to the Step S25.

In the Step S25, the section determination unit 125 calculates a difference in a feature amount between the pictures of the initial frame and the final frame among the consecutive frames. Herein, the section determination unit 125 calculates, for example, histograms of the luminance values of the pixels as the feature amount of the picture and calculates a sum of absolute values of differences between elements of the histogram of the initial frame and the histogram of the final frame.

In the Step S26, the section determination unit 125 determines whether or not the difference obtained in the Step S25 is equal to or larger than a threshold value. If the difference is determined to be equal to or larger than the threshold value in the Step S26, the procedure proceeds to the Step S27.

In the Step S27, the section determination unit 125 determines the section constructed with the consecutive candidate frames as the cross-fade section.

At this time, for example, as described above with reference to FIG. 6, it is determined whether or not the section is a cross-fade section.

On the other hand, if the difference obtained by the process of the Step S25 is smaller than the threshold value in the Step S26, the process of the Step S27 is skipped. In addition, if the number of consecutive candidate frames is determined not to be equal to or larger than the predetermined threshold value in the Step S24, the processes of the Step S25 to the Step S27 are skipped.

After the process of the Step S27, if the difference is determined to be equal to or larger than the threshold value in the Step S26, or if the number of consecutive frames is not determined to be equal to or larger than the threshold value in the Step S24, the procedure proceeds to the Step S28.

In the Step S28, it is determined whether or not the next frame exists. If the next frame is determined to exist, the procedure returns to the Step S23, and the following processes thereof are repetitively executed. On the other hand, if the next frame is not determined to exist in the Step S28, the procedure is ended.

In this manner, the cross-fade section detection process is executed. Therefore, the cross-fade sections that are the sections for specifying the scenes having important meaning in the contents may be simply detected.

As an example of the specifying of the cross-fade sections in the contents, a replay scene in the contents of a sports program, a retrospective scene in the contents of a drama series, or the like may be specified.

FIG. 10 is a diagram illustrating an example of the replay scene of the contents of the spots program. In the figure, the horizontal axis denotes time, and the portions marked by "CF" in the figure denote the cross-fade sections. As shown in the figure, in many cases, the replay scene is a scene interposed between cross-fade sections.

In the case where the contents shown in FIG. 10 are, for example, contents of a live program of a professional baseball game, the replay scene is set to the scenes where remarkably good plays are replayed, and the other scenes are set to the normal scene.

FIG. 11 is a diagram illustrating an example of the retrospective scene of the contents of the drama series or the like. In the figure, the horizontal axis denotes time, and the portions marked by "CF" in the figure denote the cross-fade sections. As shown in the figure, the retrospective scene is constructed with the scenes A to D that are interposed between the cross-fade sections. In this manner, the retrospective scene includes many portions in the contents where a plurality of cross-fade sections repetitively appears in a short time.

In the case where the contents shown in FIG. 11 are, for example, the contents of the second episode of the drama series, the scenes A to D are set to the scenes included in the preceding episode (the first episode) of the drama series, and the other scenes are set to the normal scene.

In the invention, when the digest is generated, for example, the retrospective scene shown in FIG. 11 is configured to be detected. Next, the digest is generated by searching for the scenes similar to the scenes included in the retrospective scene (for example, the scenes A to D shown in FIG. 11) from the recorded data of the contents and combining the searched scenes. The generation of the digest is performed by the digest generation unit 103 shown in FIG. 3.

The digest generation unit 103 specifies the retrospective scene in the contents, for example, as follows. Since the cross-fade section in the contents is specified through the execution of the process of the specific scene detection unit 102, which is described with reference to FIG. 7, the digest generation unit 103 detects the cross-fade section based on a result of the process of the specific scene detection unit 102. Next, if the cross-fade section is equal to or larger than a predetermined threshold value as a predetermined interval, the digest generation unit 103 specifies the portion included in the cross-fade section as the retrospective scene.

For example, in the case of FIG. 11, the digest generation unit 103 calculates a distance (for example, a temporal distance) between the cross-fade section 241 and the cross-fade section 242. For example, the distance between the cross-fade section 241 and the cross-fade section 242 is obtained by counting the number of frames existing between the final frame of the cross-fade section 241 and the initial frame of the cross-fade section 241. If the distance between the cross-fade section 241 and the cross-fade section 242 is smaller than a predetermined threshold value, the distance is obtained similarly to the distance between the cross-fade section 242 and the cross-fade section 243. In addition, if the distance between the cross-fade section 242 and the cross-fade section 243 is smaller than a predetermined threshold value, the distance is obtained similarly to the distance between the cross-fade section 243 and the cross-fade section 244.

In this manner, the digest generation unit 103 counts the number of consecutive cross-fade sections, of which the distances are smaller than the threshold value. In the example of FIG. 11, all the distances between the adjacent cross-fade sections 241 to 245 are set to be smaller than the threshold value. In this case, five consecutive cross-fade sections, of which the distances are smaller than the threshold value, are detected.

For example, in the case where the threshold value for determining whether or not a scene is the retrospective scene is set to 3, in the example of FIG. 11, since there are five consecutive cross-fade sections, of which the distances are smaller than the threshold value, the digest generation unit 103 specifies the portion including the cross-fade sections as the retrospective scene. In other words, the portion from the initial frame of the cross-fade section 241 to the final frame of the cross-fade section 245 is specified as the retrospective scene of the contents.

If the retrospective scene is specified, the digest generation unit 103 specifies, for example, the scenes A to D included in the retrospective scene shown in FIG. 11. In other words, in the portion specified as the retrospective scene, the portion constructed with the frames that are interposed between the detected cross-fade sections is specified as the scenes included in the retrospective scene.

The digest generation unit 103 searches for the scenes similar to the scenes A to D among the data supplied from the data acquisition unit 101. The searching for the similar scenes may be performed, for example, by using the method disclosed in the article written by Yashugi Yukinobu, Babaguchi Noboru, and Kitahashi Tadahiro ("Detection of Identical Events from Sports Video by Comparing Camera Works," Proceedings of The Institute of Electronics, Information and Communication Engineers, Vol. 2001, Information System 2 pp. 359-360). Alternatively, a degree of similarity of the scenes may be obtained by calculating a difference in feature amount between pictures of the frames included in the scene, and the scenes similar to the scene A to D may be searched for based on the degree of similarity.

For example, in the case where the retrospective scene shown in FIG. 11 is the contents of the k-th broadcast of the drama series, the data acquisition unit 101 supplies the data of the contents of the (k−1)-th broadcast of the drama series to the digest generation unit 103. In addition, the data supplied from the data acquisition unit 101 to the digest generation unit 103 may be designated by a user. Next, the digest generation unit 103 generates a digest of the contents of the (k−1)-th broadcast of the drama series.

In other words, the digest generation unit 103 searches for the scenes W to Z similar to the corresponding scenes A to D among the contents of the (k−1)-th broadcast of the drama series. Next, the digest generation unit 103 extracts from the contents of the (k−1)-th broadcast of the drama series the frame of the scene W and, for example, 300 temporally-consecutive frames that precede the initial frame of the scene W and 300 temporally-consecutive frames that follow the final frame of the scene W. In addition, the digest generation unit 103 generates the digest data 1 that are constructed with the frames extracted as described above.

Similarly, the digest generation unit 103 extracts from the contents of the (k−1)-th broadcast of the drama series the frame of the scene X, for example, 300 temporally-consecutive frames that precede the initial frame of the scene X and 300 temporally-consecutive frames that follow the final frame of the scene X. Therefore, the digest data 2 is generated.

The same process is also performed on the scene Y and the scene Z, so that the digest data 3 and the digest data 4 are generated.

The digest generation unit 103 is configured to generate the digest by combining the digest data 1 to 4. In other words, by consecutively replaying the digest data 1 to 4, the digest of the contents of the (k−1)-th broadcast of the drama series is generated.

Figure 12:
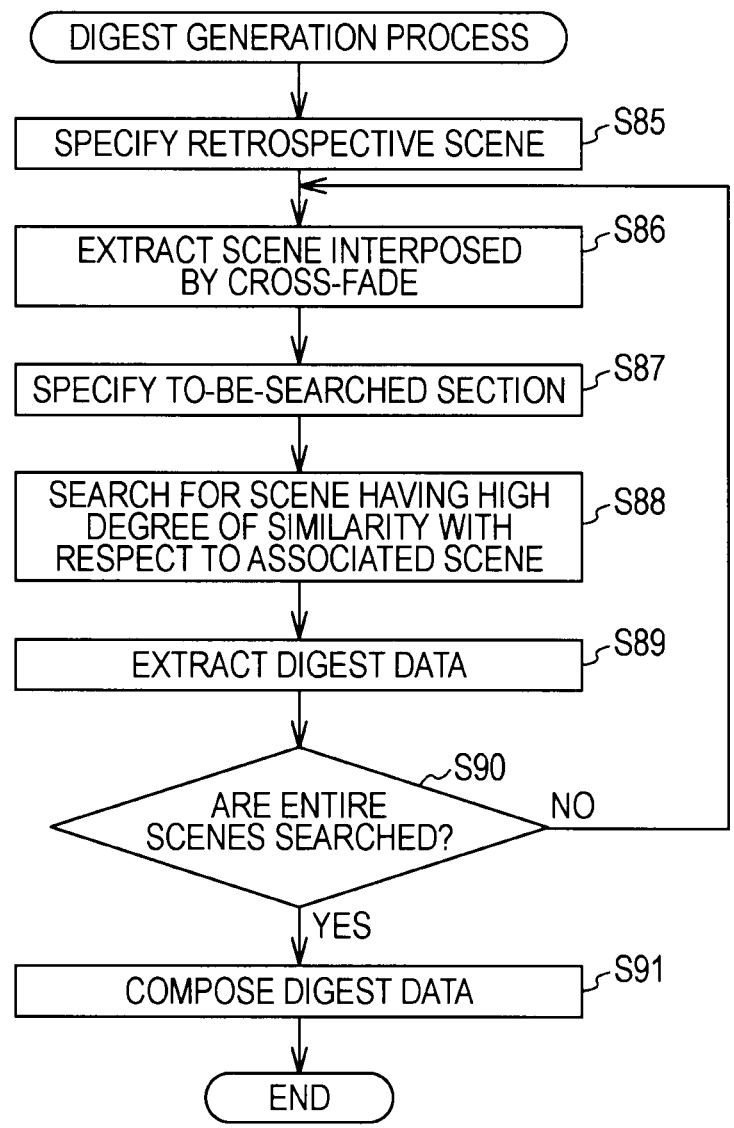
FIG. 12 is a flowchart illustrating an example of a digest generation process.

Next, an example of the digest generation process performed by the digest generation unit 103 is described with reference to a flowchart of FIG. 12.

In the Step S85, the digest generation unit 103 specifies the retrospective scene of the contents, which are the object of the cross-fade section detection process, based on a result of the cross-fade section detection process that is described with reference to a flowchart of FIG. 7. At this time, the digest generation unit 103 detects the cross-fade section in the contents, for example, based on the result of the cross-fade section detection process. Next, if the cross-fade section is equal to or larger than a predetermined threshold value as a predetermined interval, the digest generation unit 103 specifies the portion included in the cross-fade section as the retrospective scene.

In the Step S86, the digest generation unit 103 extracts the scenes interposed between the cross-fade sections in the retrospective scene specified in the Step S85. At this time, for example, the scenes A to D shown in FIG. 11 are extracted.

In the Step S87, the digest generation unit 103 specifies the to-be-processed section for searching for the scenes similar to the scenes that are extracted by the process of the Step S86. In addition, before the specifying, the to-be-searched data are supplied from the data acquisition unit 101 to the digest generation unit 103. For example, in the case where the retrospective scene shown in FIG. 11 is included in the contents of the k-th broadcast of the drama series, the data acquisition unit 101 supplies the data of the contents of the (k–1)-th broadcast of the drama series. Although the data of the contents of the k-th broadcast of the drama series may be set as the to-be-searched data, in the embodiment, an example where the data of the contents of the (k–1)-th broadcast of the drama series is set as the to-be-searched data is described.

In the process of the Step S87, a temporal section that is to be actually detected is specified among the data of the contents of the (k–1)-th broadcast of the drama series. In addition, for example, in the case where a scene similar to the scene A shown in FIG. 11 is searched, in the Step S87, the section from the initial frame to the final frame in the data of the contents of the (k–1)-th broadcast of the drama series is specified as the to-be-processed section.

In the Step S88, the digest generation unit 103 searches for the scene having high similarity to the scene (for example, the scene A) among the contents of the (k–1)-th broadcast of the drama series. In addition, in the Step S88, the scene having high similarity is searched from the to-be-processed section specified by the process of the Step S87.

In the Step S89, the digest generation unit 103 extracts the frames of the scene searched by the process of the Step S88 and a predetermined number of frames that precede the scene or that follow the scene as the digest data. In addition, the digest data may be generated so that the predetermined number of frames that precede the scene or that follow the scene are not included. Alternatively, the digest data may be generated so that the frames of the scene searched by the process of the Step S88 and the predetermined number of frames that precede the scene are included or so that the frames of the scene searched by the process of the Step S88 and the predetermined number of frames that follow the scene are included.

In the Step S90, the digest generation unit 103 determines whether or not all the scenes are searched. In this case, since a scene similar to the scenes B to D is not searched, it is determined that all the scenes are not searched, and the procedure returns to the Step S86.

After that, in the process of the Step S86, the scene B shown in FIG. 11 is extracted. Next, in the process of the Step S87, a to-be-processed section for searching for the scene similar to the scene B is newly specified.

Figure 13:
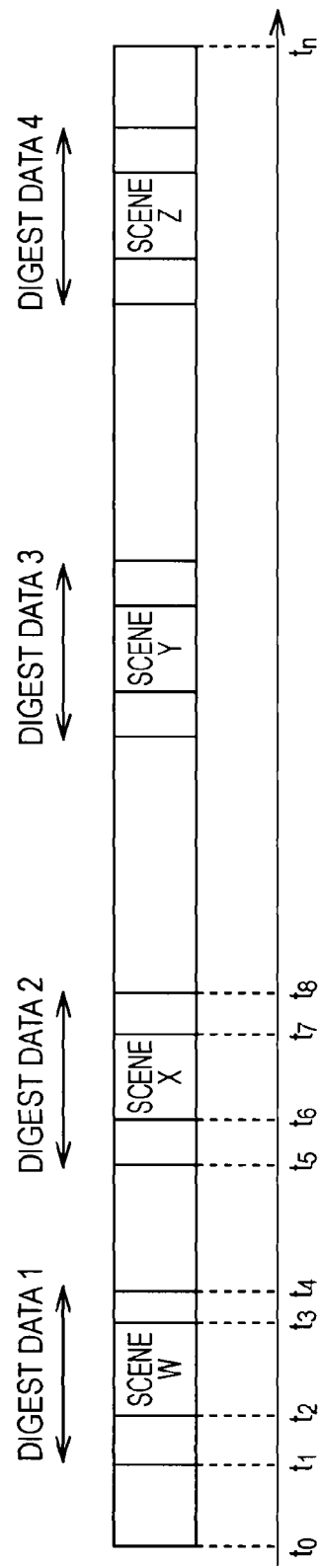
FIG. 13 is a diagram illustrating processes of a digest generation unit shown in FIG. 3.

For example, as shown in FIG. 13, the contents of the (k–1)-th broadcast of the drama series are constructed with the consecutive frames that exist from the time point t0 to the time point tn. In the case where the scene A is extracted by the process in the first execution of the Step S86, the to-be-processed section specified in the Step S87 is set to the section from the time point t0 to the time point tn. Next, in the Step S88, the scene W constructed with the frames in the section from the time point t2 to the time point t3 is searched as the scene similar to the scene A. In the Step S89, the frames in the section from the time point t1 to the time point t2 are extracted as a predetermined number of frames that precede the scene W, and the frames in the section from the time point t3 to the time point t4 are extracted as a predetermined number of frames that follow the scene W. Next, the digest data 1 are generated to be constructed with the frames in the section from the time point t1 to the time point t4.

In the case where the scene B is extracted by the process in the second execution of the Step S86, the to-be-processed section specified in the Step S87 is set to the section from the time point t3 to the time point tn. In other words, the scenes A to D included in the retrospective scene of the contents of the k-th broadcast of the drama series are considered to be the scenes that sequentially appear in the contents of the (k–1)-th broadcast of the drama series. Therefore, since the scene X similar to the scene B appears temporally after the scene W similar to the scene A, the to-be-processed section specified through the second execution of the Step S87 is set to the section from the time point t3 to the time point tn.

In the process of the second execution of the Step S88, the scene X constructed with the frames from the time point t6 to the time point t7 is searched as the scene similar to the scene B. Next, in the process of the second execution of the Step S89, a predetermined number of frames before the scene X and a predetermined number of frames after the scene X together with the frames included in the scene X are extracted, and the digest data 2 constructed with the frames in the section from the time point t5 to the time point t8 is generated.

In addition, in the process of the following third execution of the Step S86, the scene C is extracted. In the process of the Step S87, the section from the time point t7 to the time point to is set to the to-be-processed section.

In this manner, the scenes W to Z similar to the corresponding scenes A to D are searched, and the digest data 1 to 4 are generated.

In addition, only the scenes W to Z may be extracted so as to generate the digest data 1 to 4. For example, in the case of generating the digest data 1, the frames in the section from the time point t2 to the time point t3 are extracted so that a predetermined number of frames before the scene W or a predetermined number of frames after the scene W are not included, and the digest data 1 may be generated by using only the frames. However, in the case where the digest data are extracted in this manner, the digest generated by combing the digest data becomes substantially the same as the retrospective scene of the contents of the k-th broadcast of the drama series.

Returning to FIG. 12, if it is determined that all the scenes are searched in the Step S90, the procedure proceeds to the Step S91.

In the Step S91, the digest generation unit 103 combines the digest data 1 to 4. In other words, the digest is generated so that digest data 1 to 4 are sequentially replayed.

In this manner, the digest generation process is executed.

In the related art, it is difficult to extract important scenes from pictures, sounds, captions, and the like included in the contents because the extraction depends on the details of the contents. For example, an unimportant scene may be erroneously extracted, or an especially important scene may not be extracted in the generation of the digest.

However, in the invention, since the digest is generated by specifying the retrospective scene and extracting the scenes similar to the scenes included in the retrospective scene, the digest constructed with the important scenes may be securely generated. In addition, as described above, since the retrospective scene is specified after the detection of the cross-fade sections, the retrospective scene may be suitably specified.

In addition, in the related art, a great deal of time is taken to perform the process of analyzing the data of the contents and searching for the portion of the similar scenes.

However, in the invention, every time that a scene similar to the scene included in the retrospective scene is searched, the to-be-searched section is reduced, so that it is possible to shorten the time taken for searching.

Therefore, according to the invention, it is possible to generate the digest including the especially important scenes in a short time.

Although the invention is mainly described as to the generation of the digest hereinbefore, the invention may be merely used to, for example, detect the cross-fade section. In the contents processing apparatus 1 according to the invention, by specifying the cross-fade sections, for example, a replay scene or a retrospective scene may be specified, and a desired scene may be searched in a short time.

In addition, the aforementioned series of processes may be executed in a hardware manner or in a software manner. In the case where the aforementioned series of processes is executed in a software manner, a program configuring the software may be installed through a network or from a recording medium to a computer in which dedicated hardware is assembled or to a computer in which various programs are installed to execute various functions, for example, a general-purpose personal computer 700 as shown in FIG. 14.

Figure 14:
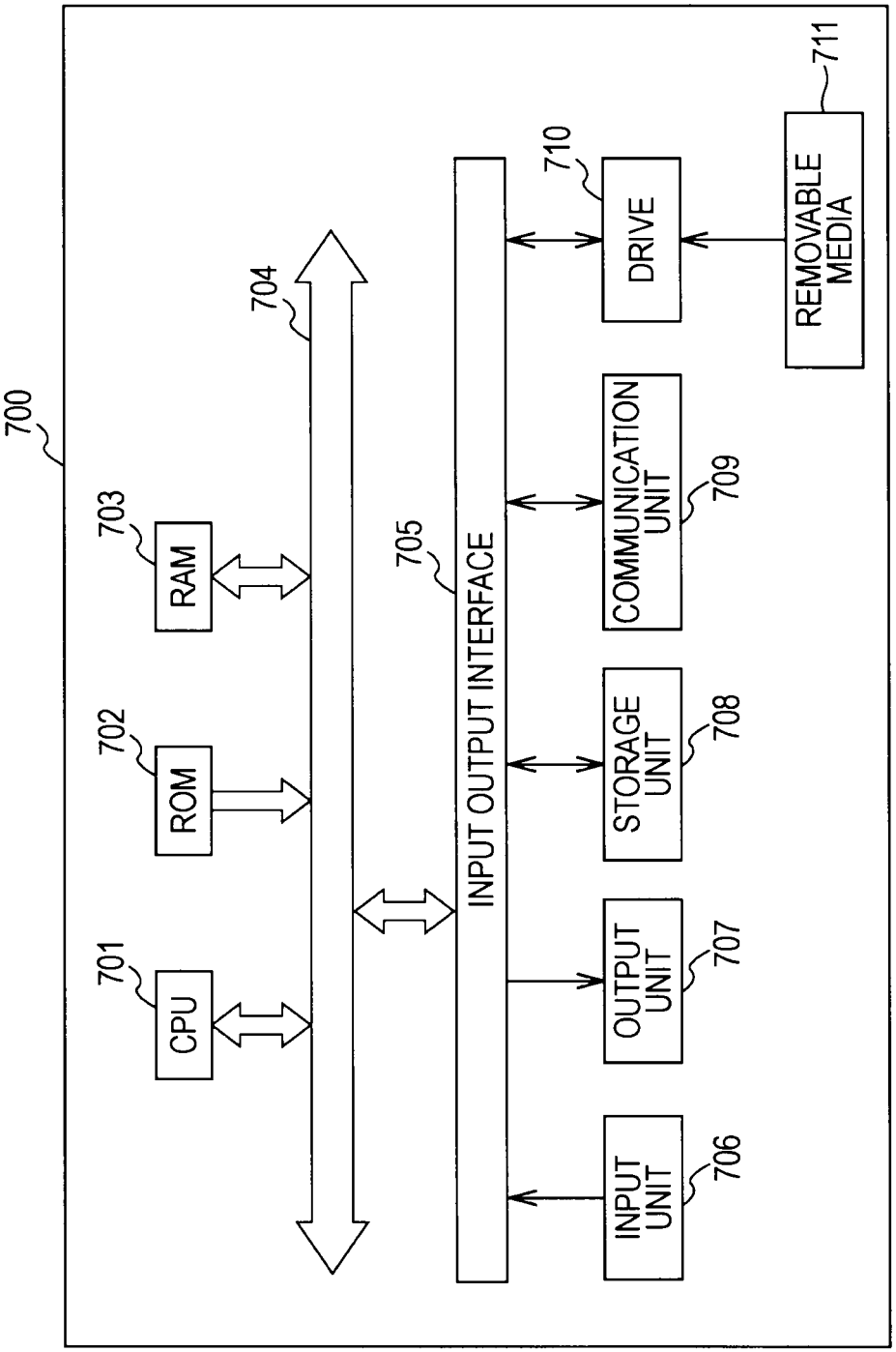
FIG. 14 is a block diagram illustrating an example of a configuration of a personal computer.

In FIG. 14, a CPU (central processing unit) 701 executes various processes according to a program stored in a ROM (read only memory) 702 or a program loaded on a RAM (random access memory) 703 from the storage unit 708. In addition, suitable data necessary for the various processes executed by the CPU 701 are also stored in the RAM 703.

The CPU 701, the ROM 702, and the RAM 703 are connected to each other through a bus 704. In addition, an input output interface 705 is also connected to the bus 704.

An input unit 706 including a keyboard, a mouse, and the like, an output unit 707 including a display such as an LCD (liquid crystal display), a speaker, and the like, a storage unit 708 including a hard disc and the like, and a communication unit 709 including an interface card such as a modem and a LAN card are connected to the input output interface 705. The communication unit 709 performs a communication process though a network including the Internet.

In addition, if necessary, a drive 710 is connected to the input output interface 705, and a removable media 711 such as a magnetic disc, an optical disc, an opto-magnetic disc, or a semiconductor memory is suitably mounted. If necessary, a computer program read therefrom is installed in the storage unit 708.

In the case where the aforementioned series of processes are executed by software, a program configuring the software is installed through a network such as the Internet or from a recording medium such as the removable media 711.

In addition, as shown in FIG. 14, the recording medium is configured as a removable media 711 such as a magnetic disc (including a floppy disk (registered trade mark)), an optical disc (including a CD-ROM (compact disc-read only memory) and a DVD (digital versatile disc)), an opto-magnetic disc (including a MD (mini-disk) (registered trade mark)), or a semiconductor memory, which records a program therein and which is distributed so as to provide the program a user. In addition, the recording medium may be configured as a ROM 702 or a hard disc drive included in the storage unit 708, which records a program therein and which is provided to a user in a state where it is assembled into a body of the apparatus.

In addition, the aforementioned series of processes described in the specification includes processes that are performed in a time sequence manner according to the described order and processes that are performed in a parallel manner or in an individual manner instead of the time sequence manner.

The present application contains subject matter related to that disclosed in Japanese Priority Patent Application JP 2009-025517 filed in the Japan Patent Office on Feb. 6, 2009, the entire content of which is hereby incorporated by reference.

In addition, the embodiments of the invention are not limited to the aforementioned embodiments, but various modifications may be made within the scope of the invention without departing from the spirit of the invention.

What is claimed is:

1. A contents processing apparatus comprising:
   means for acquiring data of contents;
   means for detecting from the acquired data of the contents a cross-fade section that includes at least three frames constituting a portion where a final picture of a predetermined scene is gradually changed over the at least three frames to a picture of the next scene, corresponding to a last frame of the cross-fade section;
   means for specifying a retrospective scene, where a plurality of scenes are changed in a predetermined interval, based on the detected cross-fade section;
   means for searching for scenes similar to the plurality of the scenes included in the specified retrospective scene from data of different contents acquired by the means for acquiring; and
   means for generating a digest of the different contents by combining the searched scenes.

2. The contents processing apparatus according to claim 1, wherein the means for detecting includes:
   means for calculating an occupation ratio of monotonously-changing pixels, of which values are monotonously changed across a window of at least three frames, to a to-be-processed frame in the data of the contents;
   means for calculating an activity ratio between the to-be-processed frame and a frame before the to-be-processed frame;
   means for determining based on the calculated occupation ratio of the monotonously-changing pixels and the calculated activity ratio whether or not the to-be-processed frame is a candidate frame in the cross-fade section; and
   means for detecting the cross-fade section by counting candidate frames that consecutively appear from the data of the contents.

3. The contents processing apparatus according to claim 2, wherein the means for calculating the occupation ratio sets the to-be-processed frame to a current frame, determines whether or not a pixel of interest of the current frame is a monotonously-changing pixel by comparing a value of the pixel of interest of the current frame with values of pixels in a past frame and a future frame corresponding to the pixel of interest, and calculates a ratio of the pixels, which are determined to be the monotonously-changing pixels, to all the pixels constituting the current frame.

4. The contents processing apparatus according to claim 3, wherein, in the case where the pixel of interest and the value of the pixel corresponding to the pixel of interest are changed to be increased with the passing of time or in the case where the pixel of interest and the value of the pixel corresponding to the pixel of interest are changed to be decreased with the passing of time, if an amount of change according to the passing of time is larger than a predetermined threshold value, the pixel of interest is determined to be the monotonously-changing pixel.

5. The contents processing apparatus according to claim 2, wherein, if a difference between a feature amount of a first frame and a feature amount of a second frame that temporally precedes the first frame by a predetermined number of frames is equal to or larger than a predetermined threshold value, the first frame is set to the to-be-processed frame.

6. The contents processing apparatus according to claim 2, wherein, in the case where a number of consecutively appearing candidate frames is equal to or larger than a predetermined threshold value, if a value of difference between a feature amount of an initial candidate frame of the consecutive candidate frames and a feature amount of a final candidate frame thereof is equal to or larger than a predetermined value, the means for detecting the cross-fade section detects a section from the initial candidate frame to the final candidate frame as the cross-fade section.

7. The contents processing apparatus according to claim 1, wherein, in the case where a predetermined number or more of cross-fade sections are consecutively detected in a temporal distance that is smaller than a threshold value, the means for specifying specifies a portion from an initial cross-fade section to a final cross-fade section of the consecutive cross-fade sections as the retrospective scene.

8. The contents processing apparatus according to claim 7, wherein the means for searching searches for scenes similar to scenes corresponding to a portion interposed between the cross-fade sections in the specified retrospective scene from the data of the different contents, and
wherein means for generating generates the digest by combining data added with a predetermined number of consecutive frames before or after the searched scenes.

9. The contents processing apparatus according to claim 8, wherein, the means for searching searches a second scene similar to a first scene that is positioned temporally at an earliest point in the scenes corresponding to the portion interposed between the cross-fade sections among the specified retrospective scene from the data of the different contents, and
wherein, the means for searching searches a fourth scene similar to a third scene that is temporally later than the first scene in the scenes corresponding to the portion interposed between the cross-fade sections among the specified retrospective scene from a portion that is temporally later than the second scene among the data of different contents.

10. A contents processing method comprising:
acquiring data of contents;
detecting, using a processor, from the acquired data of the contents a cross-fade section that includes at least three frames constituting a portion where a final picture of a predetermined scene is gradually changed over the at least three frames to a picture of the next scene, corresponding to a last frame of the cross-fade section;
specifying a retrospective scene, where a plurality of scenes are changed in a predetermined interval, based on the detected cross-fade section;
searching for scenes similar to the plurality of the scenes included in the specified retrospective scene from data of different contents acquired in the acquiring; and
generating, using a processor, a digest of the different contents by combining the searched scenes.

11. A contents processing apparatus comprising:
a contents data acquisition unit that acquires data of contents;
a section detection unit that detects from the acquired data of the contents a cross-fade section that includes at least three frames constituting a portion where a final picture of a predetermined scene is gradually changed over the at least three frames to a picture of the next scene, corresponding to a last frame of the cross-fade section;
a scene specifying unit that specifies a retrospective scene, where a plurality of scenes are changed in a predetermined interval, based on the detected cross-fade section;
a similar scene searching unit that searches for scenes similar to the plurality of the scenes included in the specified retrospective scene from data of different contents acquired by the contents data acquisition unit; and
a digest generation unit that generates a digest of the different contents by combining the searched scenes.

12. The contents processing apparatus according to claim 11, wherein the section detection unit includes:
a ratio calculation unit that calculates an occupation ratio of monotonously-changing pixels, of which values are monotonously changed across a window of at least three frames, to a to-be-processed frame in the data of the contents;
an activity ratio calculation unit that calculates an activity ratio between the to-be-processed frame and a frame before the to-be-processed frame;
a candidate frame determination unit that determines based on the calculated occupation ratio of the monotonously-changing pixels and the calculated activity ratio whether or not the to-be-processed frame is a candidate frame in the cross-fade section; and
a consecutive frame counting unit that detects the cross-fade section by counting candidate frames that consecutively appear from the data of the contents.

13. The contents processing apparatus according to claim 12, wherein the ratio calculation unit sets the to-be-processed frame to a current frame, determines whether or not a pixel of interest of the current frame is a monotonously-changing pixel by comparing a value of the pixel of interest of the current frame with values of pixels in a past frame and a future frame corresponding to the pixel of interest, and calculates a ratio of the pixels, which are determined to be the monotonously-changing pixels, to all the pixels constituting the current frame.

14. The contents processing apparatus according to claim 13, wherein, in the case where the pixel of interest and the value of the pixel corresponding to the pixel of interest are changed to be increased with the passing of time or in the case where the pixel of interest and the value of the pixel corresponding to the pixel of interest are changed to be decreased with the passing of time, if an amount of change according to the passing of time is larger than a predetermined threshold value, the pixel of interest is determined to be the monotonously-changing pixel.

15. The contents processing apparatus according to claim 12, wherein, if a difference between a feature amount of a first frame and a feature amount of a second frame that temporally precedes the first frame by a predetermined number of frames is equal to or larger than a predetermined threshold value, the first frame is set to the to-be-processed frame.

16. The contents processing apparatus according to claim 12, wherein, in the case where a number of consecutively appearing candidate frames is equal to or larger than a predetermined threshold value, if a value of difference between a feature amount of an initial candidate frame of the consecutive candidate frames and a feature amount of a final candidate frame thereof is equal to or larger than a predetermined value, the section detection unit detects a section from the initial candidate frame to the final candidate frame as the cross-fade section.

17. The contents processing apparatus according to claim 11, wherein, in the case where a predetermined number or more of cross-fade sections are consecutively detected in a temporal distance that is smaller than a threshold value, the scene specifying unit specifies a portion from an initial cross-fade section to a final cross-fade section of the consecutive cross-fade sections as the retrospective scene.

18. The contents processing apparatus according to claim 17,
wherein the similar scene searching unit searches for scenes similar to scenes corresponding to a portion interposed between the cross-fade sections in the specified retrospective scene from the data of the different contents, and
wherein the digest generation unit generates the digest by combining data added with a predetermined number of consecutive frames before or after the searched scenes.

19. The contents processing apparatus according to claim 18,
wherein, the similar scene searching unit searches a second scene similar to a first scene that is positioned temporally at an earliest point in the scenes corresponding to the portion interposed between the cross-fade sections among the specified retrospective scene from the data of the different contents, and
wherein, the similar scene searching unit searches a fourth scene similar to a third scene that is temporally later than the first scene in the scenes corresponding to the portion interposed between the cross-fade sections among the specified retrospective scene from a portion that is temporally later than the second scene among the data of different contents.

\* \* \* \* \*